(12) United States Patent
Hamers et al.

(10) Patent No.: US 10,052,606 B2
(45) Date of Patent: Aug. 21, 2018

(54) DIAMOND ELECTRON EMITTER USING AMINO-TERMINATION

(71) Applicant: Wisconsin Alumni Research Foundation, Madison, WI (US)

(72) Inventors: Robert John Hamers, Madison, WI (US); Di Zhu, Covina, CA (US); Marco Diego Torelli, Madison, WI (US)

(73) Assignee: WISCONSIN ALUMNI RESEARCH FOUNDATION, Madison, WI (US)

(*) Notice: Subject to any disclaimer, the term of this patent is extended or adjusted under 35 U.S.C. 154(b) by 328 days.

(21) Appl. No.: 14/814,653

(22) Filed: Jul. 31, 2015

(65) Prior Publication Data
US 2017/0028378 A1    Feb. 2, 2017

(51) Int. Cl.
*B01J 19/12*    (2006.01)

(52) U.S. Cl.
CPC .......... *B01J 19/121* (2013.01); *B01J 19/123* (2013.01); *B01J 19/127* (2013.01); *B01J 2219/0875* (2013.01); *B01J 2219/0892* (2013.01); *B01J 2219/12* (2013.01)

(58) Field of Classification Search
CPC ...... B01J 19/121; B01J 19/123; B01J 19/127; B01J 2219/0875; B01J 2219/12; B01J 2219/0892
USPC ............ 204/157.46, 157.6–158.21; 205/340
See application file for complete search history.

(56) References Cited

U.S. PATENT DOCUMENTS

| | | | |
|---|---|---|---|
| 5,466,425 A | 11/1995 | Adams | |
| 5,776,323 A * | 7/1998 | Kobashi | C02F 1/46109 204/294 |
| 5,777,372 A * | 7/1998 | Kobashi | C12Q 1/001 257/414 |
| 7,005,795 B2 | 2/2006 | Pickard et al. | |
| 8,986,532 B2 * | 3/2015 | Hamers | C01B 21/1409 204/157.46 |
| 9,708,716 B2 * | 7/2017 | Hamers | C01B 21/1409 |
| 2003/0170906 A1 | 9/2003 | Swain et al. | |

(Continued)

FOREIGN PATENT DOCUMENTS

| | | |
|---|---|---|
| JP | 2001-089887 | 4/2001 |
| JP | 2005-285729 | 10/2005 |
| WO | WO 2011-010109 | 1/2011 |

OTHER PUBLICATIONS

Agenda for interview of Nov. 14, 2017.*

(Continued)

*Primary Examiner* — Ibrahime A Abraham
*Assistant Examiner* — Colleen M Raphael
(74) *Attorney, Agent, or Firm* — Bell & Manning, LLC

(57) ABSTRACT

Methods for the photoreduction of molecules are provided, the methods comprising illuminating an amino-terminated diamond surface comprising amino groups covalently bound to the surface of diamond with light comprising a wavelength sufficient to excite an electronic transition defined by the energy band structure of the amino-terminated diamond, thereby inducing the emission of electrons from the amino-terminated diamond surface into a sample comprising molecules to be reduced, wherein the emitted electrons induce the reduction of the molecules to form a reduction product; and collecting the reduction product.

23 Claims, 11 Drawing Sheets

(56) References Cited

U.S. PATENT DOCUMENTS

Figures 1A, 1B, 1C:
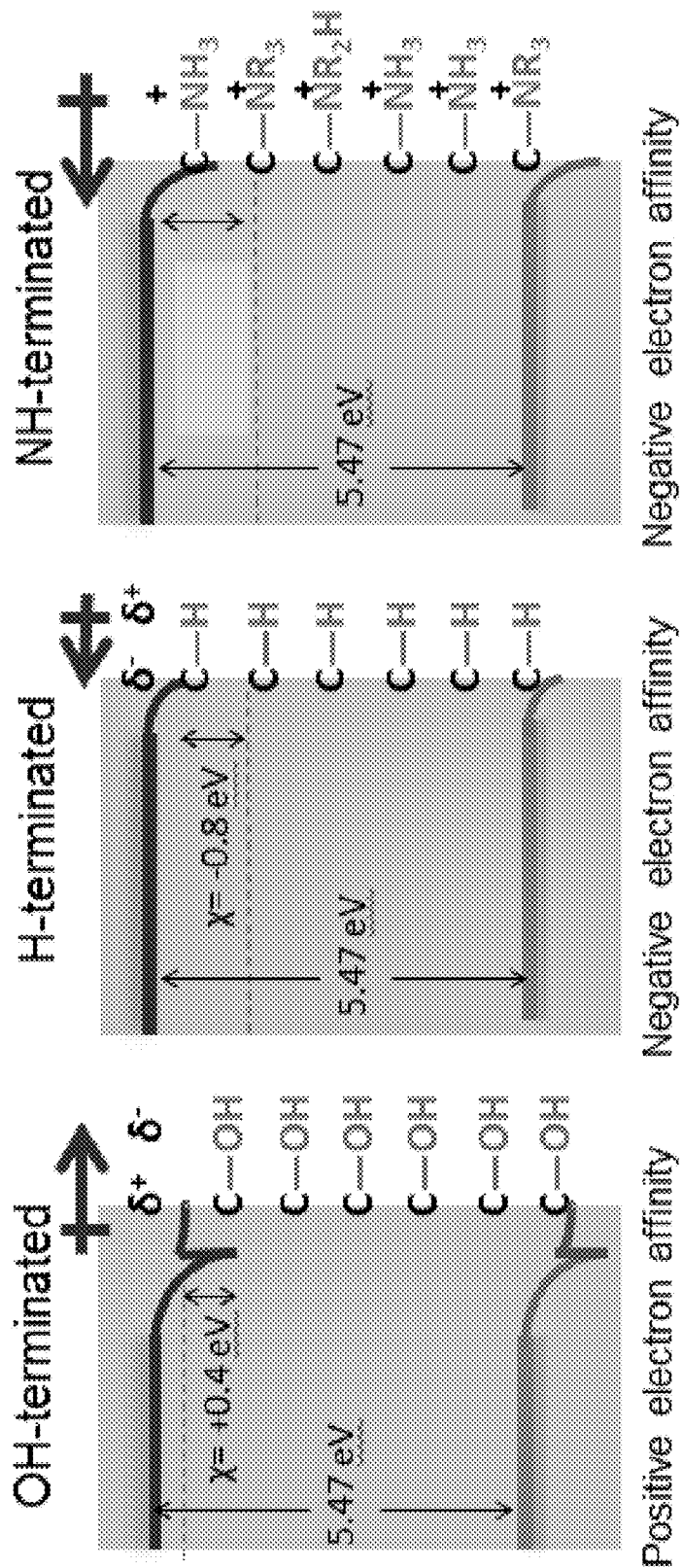

2013/0192977 A1    8/2013    Hamers et al.

OTHER PUBLICATIONS

Hartl et al, "Protein-modified nanocrystalline diamond thin films for biosensor applications," Nature Materials vol. 3 Oct. 1, 2004 p. 736-742 (Year: 2004).*
Sund et al, "Diamond for Biosensing: Electrochemical Detection of NOx Species with Thiol-Amine Functionalized Diamond," J. of the Electrochemical Society, 162(8) B225-B229 (2015), published May 23, 2015 (Year: 2015).*
International Search Report and Written Opinion mailed in PCT/US2012/064128, dated Mar. 18, 2013.
Takeuchi et al., Direct observation of negative electron affinity in hydrogen-terminated diamond surfaces, Applied Physics Letters, vol. 86, No. 152103, Apr. 5, 2005.
Sun et al., Combined visible light photo-emission and low temperature thermionic emission from nitrogen doped diamond films, Applied Physics Letters, vol. 99, No. 202101, dated Nov. 14, 2011, pp. 1-3.
Bandis et al., Photoelectric emission from negative-electron-affinity diamond (111) surfaces: Exciton breakup versus conduction-band emission, Physical Review B, vol. 52, No. 16, Oct. 15, 1995, pp. 12056-12071.
Bazhenova et al., Nitrogen fixation in solution, Coordination Chemistry Reviews, vol. 144, Oct. 1995, pp. 69-145.
Chiesa et al., Excess Electrons Stabilized on Ionic Oxide Surfaces, Acc. Chem. Res., vol. 39, No. 11, Aug. 16, 2006, pp. 861-867.
Gilmore, Potential Energy Curves for $N_2$, NO, $O_2$ and Corresponding Ions, J. Quant. Spectrose. Radiat. Transfer, vol. 5, 1965, pp. 369-389.
Hoshino et al., Dinitrogen photofixation properties of different titanium oxides in conducting polymer/titanium oxide hybrid systems, Applied Catalysis B: Environmental, vol. 79, Oct. 13, 2007, pp. 81-88.
Baumann et al., Electron affinity and Schottky barrier height of metal-diamond (100), (111), and (110) interfaces, Journal of Applied Physics, vol. 83, No. 4, Feb. 15, 1998, pp. 2072-2082.
Chiesa et al., Reductive Activation of the Nitrogen Molecule at the Surface of "Electron-Rich" MgO and CaO. The $N_2^-$ Surface Adsorbed Radical Ion, J. Phys. Chem. B, vol. 105, Dec. 19, 2000, pp. 497-505.
Cui et al., Low-threshold electron emission from diamond, Physical Review B, vol. 60, No. 23, Dec. 15, 1999, pp. 16135-16142.
Gustev et al., Does $N_2^-$ exist? A coupled-cluster study, Journal of Chemical Physics, vol. 110, No. 11, Mar. 15, 1999, pp. 5137-5139.
Leigh, Fixing Nitrogen Any Which Way, Science, vol. 279, No. 5350, Jan. 23, 1998, pp. 506-507.
Li et al., Photocatalytic Synthesis and Photodecomposition of Ammonia Over $SrTiO_3$ and $BaTiO_3$ Based Catalysts, Chemistry Letters, 1983, pp. 321-324.
Miyama et al., Heterogeneous Photocatalytic Synthesis of Ammonia From Water and Nitrogen, Chemical Physics Letters, vol. 74, No. 3, Sep. 15, 1980, pp. 523-524.
Rao et al., Photocatalytic reduction of nitrogen over (Fe, Ru or OS)/$TiO_2$, catalysts, Applied Catalysis B: Environmental, vol. 5, Dec. 31, 1994, pp. 33-42.
Soria et al., Dinitrogen Photoreduction to Ammonia over Titanium Dioxide Powders Doped with Ferric Ions, J. Phys. Chem., vol. 95, 1991, pp. 274-282.
Van der Weide et al., Negative-electron-affinity effects on the diamond (100) surface, Physical Review B, vol. 50, No. 8, Aug. 15, 1994, pp. 5803-5806.
Litter et al., Photocatalytic properties of iron-doped titania semiconductors, Journal of Photochemistry and Photobiology A: Chemistry, vol. 98, Aug. 23, 1996, pp. 171-181.
Ranjit et al., Photocatalytic reduction of dinitrogen to ammonia over noble-metal-loaded $TiO_2$, Journal of Photochemistry and Photobiology A: Chemistry, vol. 96, May 31, 1996, pp. 181-185.
Schrauzer et al., Photolysis of Water and Photoreduction of Nitrogen on Titanium Dioxide, Journal of the American Chemical Society, vol. 99, Oct. 26, 1977, pp. 7189-7193.
Tennakone et al., Photocatalytic Nitrogen Reduction using Visible Light, J. Chem. Soc. Chem. Commun., Jan. 1, 1987, pp. 1078-1080.
Vettraino et al., Room-Temperature Ammonia Formation from Dinitrogen on a Reduced Mesoporous Titanium Oxide Surface with Metallic Properties, J. Am. Chem. Soc., vol. 124, Jul. 19, 2002, pp. 9567-9573.
Murakami et al, "Electrolytic Synthesis of Ammonia from Water and Nitrogen under Atmospheric Pressure Using a Boron-Doped Diamond Electrode as a Nonconsumable Anode," Electrochemical and Solid-State Letters, 10(4) E4-E6 (2007).
Kraft et al, "Anodic oxidation with doped diamond electrodes: a new advanced oxidation process," J. of Hazardous Materials B103 (2003) pp. 247-261.
Swain et al, "The Electrochemical Activity of Boron-Doped Polycrystalline Diamond Thin Film Electrodes," Anal. Chem. 1993, vol. 65, pp. 345-351.
D. Zhu, Diamond as a Solvated Electron Source for Nitrogen Reduction, dissertation, University of Wisconsin—Madison, Aug. 26, 2014.
Ma et al., Study of ammonia molecule adsorbing on diamond (100) surface, Applied Surface Science 256, Feb. 4, 2010, pp. 4136-4141.

* cited by examiner

DIAMOND ELECTRON EMITTER USING AMINO-TERMINATION

REFERENCE TO GOVERNMENT RIGHTS

This invention was made with government support under 1207281 and 1240151 awarded by the National Science Foundation. The government has certain rights in the invention.

BACKGROUND

Diamond is a wide-bandgap semiconductor with a bandgap of 5.5 eV. The surface of diamond, when terminated with hydrogen atoms, is known to be an excellent electron emitter. Hydrogen atoms on the surface lead to a property known as negative electron affinity (NEA), in which the conduction band lies above the so-called "vacuum level," which is the energy of a free electron in space. Whereas with conventional semiconductors electrons are bound inside the material by several electron-volts even when illuminated with light, when electrons are excited to the conduction band of hydrogen-terminated diamond, the electrons have no barrier to emission. Consequently, excitation of hydrogen-terminated diamond with light more energetic than its bandgap leads to facile electron emission. Electron emission can also be stimulated electrically by using an applied electrical potential through a process known as field emission. Electrons emitted from hydrogen-terminated diamond via light or applied electrical potential are capable of inducing a variety of reduction reactions (e.g., $N_2$ to $NH_3$ or $CO_2$ to CO) in fluid samples (e.g., aqueous samples) without requiring the reactants to be adsorbed to the surface of the hydrogen-terminated diamond.

SUMMARY

Amino-terminated diamond surfaces, methods of making amino-terminated diamond surfaces, and methods of using the amino-terminated diamond surfaces as solid-state electron emitters are provided. As compared to hydrogen-terminated diamond surfaces, the amino-terminated diamond surfaces exhibit superior electron emission and are surprisingly and significantly more chemically stable in the presence of UV light and water.

In one aspect, a method for the photoreduction of molecules is provided which comprises illuminating an amino-terminated diamond surface comprising amino groups covalently bound to the surface of diamond with light comprising a wavelength sufficient to excite an electronic transition defined by the energy band structure of the amino-terminated diamond, thereby inducing the emission of electrons from the amino-terminated diamond surface into a sample comprising molecules to be reduced, wherein the emitted electrons induce the reduction of the molecules to form a reduction product; and collecting the reduction product.

In another aspect, a reduction system is provided which comprises a reduction cell comprising amino-terminated diamond comprising amino groups covalently bound to the surface of diamond, the reduction cell further comprising a sample comprising the molecules to be reduced; a light source configured to illuminate at least a portion of the reduction cell with light having a wavelength sufficient to excite an electronic transition defined by the energy band structure of the amino-terminated diamond, thereby inducing the emission of electrons from the amino-terminated diamond surface into the sample to induce the reduction of the molecules to form a reduction product; and a reduction product collection cell configured to collect the reduction product generated in the reduction cell.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

FIGS. 1A-C show schematic illustrations of OH-terminated (A), H-terminated (B) and amino-terminated (C) diamond surfaces according to illustrative embodiments.

FIG. 2 illustrates the transient light absorption measurement of solvated electrons produced by photoemission from functionalized diamond surfaces.

FIG. 3 shows the photoelectron emission at UV excitation wavelength of 210 nm from H-terminated and amino-terminated B-doped diamond, measured by transient light absorption at UV pulse energy of 0.79 mJ. The waveforms are fitted with exponential decay function of $V=B+A_o\exp^{-t/\tau}$.

FIG. 4 shows the absorption signal of solvated electrons at 210 nm as a function of UV power from H-terminated and amino-terminated B-doped diamond.

FIGS. 5A-B show Mott-Schottky measurements of the hydrogen-terminated (A) and amino-terminated (B) B-doped diamond in 0.1 M KCl solution at 2 kHz.

FIG. 6 shows the SPV signal as a function of UV photon energy from amino-terminated B-doped diamond before and after acidification, measured at UV pulse energy of 0.1 mJ.

FIG. 7 shows the UPS spectra of amino-terminated diamond before and after reacting with HCl.

FIGS. 8A-B show the XPS spectra of amino-terminated and H-terminated diamond before and after 12 hours of illumination with 450 W UV-enhanced HgXe lamp. FIG. 8A shows the amount of surface nitrogen on amino-terminated diamond before and after illumination and FIG. 8B shows the amount of surface oxygen on amino-terminated and H-terminated diamond before and after illumination.

FIG. 9 is a schematic depiction of a reduction system 900 according to an illustrative embodiment. The reduction system 900 comprises a reduction cell 902 which comprises a fluid sample 904 comprising the molecules to be reduced and an amino-terminated diamond surface 906. The molecules to be reduced are introduced into the fluid sample 904 via the inlet port 908. The reduction system 900 further comprises a light source 910 configured to illuminate a portion of the reduction cell 902 with light 912. The reduction system 900 further comprises a reduction product collection cell 914 configured to collect reduction product generated by the reduction cell 902 via outlet port 916.

DETAILED DESCRIPTION

Amino-Terminated Diamond Surfaces

The term "diamond" refers to carbon materials, wherein the carbon atoms are primarily $sp^3$ hybridized, and includes species of diamond having varying degrees of crystallinity. Suitable carbon materials having $sp^3$ hybridization≥50% include microcrystalline diamond, nanocrystalline diamond, ultrananocrystalline diamond and diamond-like materials, such as tetrahedral amorphous carbon (ta-C). The diamond can be a high-quality, electronics-grade diamond. However, lower grade diamond, including diamond grit can be used.

The diamond can assume different forms. By way of illustration, the diamond can be provided in the form of a powder that forms a suspension in a fluid sample. Diamond powders characterized by different average particle sizes may be used. By way of illustration, diamond powders characterized by an average particle size in the range of from about 100 nm to about 300 nm may be used. Alternatively, the diamond can be provided as a coating on a support substrate or can be otherwise integrated into the support substrate to provide a diamond electrode that can be immersed into a fluid sample. The diamond electrode may be formed substantially entirely of diamond.

In some embodiments, the diamond is not in contact with or associated with another active material, i.e., a material which is capable of emitting electrons under conditions which induce the emission of electrons from the diamond. By way of illustration, in some embodiments, the diamond is not in contact with silicon. When diamond electrodes are used, in some embodiments, the support substrate does not comprise silicon and the diamond electrode is substantially free of silicon.

The diamond can be undoped or doped. The dopants can be p-type dopants, e.g., boron (B) atoms, or n-type dopants, e.g., nitrogen (N) or phosphorus (P) atoms. Undoped diamond has a strong absorption in the UV region of the electromagnetic spectrum. By comparison, nitrogen-doped diamond or diamond doped with other n-type dopants can also absorb longer wavelengths of light, even visible light.

The surface of the diamond is amino-terminated, by which it is meant that amino groups are covalently bound to the surface of the diamond. The amino groups can be directly covalently bound to the surface of the diamond, i.e., the nitrogen atoms of the amino groups may be directly covalently bound to the surface of the diamond without any intervening atoms or molecular groups between the nitrogen atoms and the surface of the diamond. The term "amino group" includes functional groups in which the nitrogen atom comprises a lone electron pair as well as functional groups in which the nitrogen atom is positively charged. Thus, the term "amino group" encompasses primary amino groups, secondary amino groups, tertiary amino groups, quaternary amino groups as well as the protonated states of primary amino groups, secondary amino groups and tertiary amino groups.

The amino groups may comprise or consist of $-NR_1R_2$ groups wherein "—" denotes the covalent bond to the diamond surface and $R_1$ and $R_2$ independently selected from hydrogen, alkyl and aryl groups. However, in some embodiments $R_1$ and $R_2$ are not aryl groups. The amino groups may comprise or consist of $-NR_1R_2R_3^+$ groups wherein "—" denotes the covalent bond to the diamond surface and $R_1$, $R_2$ and $R_3$ are independently selected from hydrogen, alkyl and aryl groups. However, in some embodiments $R_1$, $R_2$ and $R_3$ are not aryl groups.

Alkyl groups can include linear, branched or cyclic alkyl groups in which the number of carbons may range from, e.g., 2 to 12, 2 to 6, 2 to 4, 2 to 3, etc. Alkyl groups can be unsubstituted, by which it is meant the alkyl group contains no heteroatoms. Alkyl groups can be substituted, by which it is meant an unsubstituted alkyl group in which one or more bonds to a carbon(s) or hydrogen(s) are replaced by a bond to non-hydrogen and non-carbon atoms. An illustrative alkyl group is methyl.

Aryl groups can be monocyclic having one aromatic ring or polycyclic having fused aromatic rings (e.g., two, three, etc. rings). Monocyclic aryl groups can be unsubstituted or substituted as described above with respect to alkyl groups. Polycyclic aryl groups are unsubstituted.

Illustrative amino groups include $-NH_2$, $-NH_3^+$, $-N(CH_3)_2$, $-N(CH_3)_2H^+$, and $-N(CH_3)_3^+$. The amino groups on surface of the diamond may be the same type of amino group or the surface may be terminated with different types of amino groups.

The surface coverage of amino groups on the diamond surfaces is not particularly limited. However, the surface coverage is typically maximized to achieve highly functionalized diamond surfaces. In some embodiments, the surface coverage of amino groups is at least 1 group/nm$^2$. This includes embodiments in which the surface coverage is at least 2 groups/nm$^2$, at least 3 groups/nm$^2$, etc. In some embodiments, a monolayer of amino groups is covalently bound to the surface of the diamond.

The amino-terminated diamond surfaces may be made using a variety of techniques. One method comprises exposing a diamond surface to a plasma formed from a gas comprising an amino group precursor. The choice of amino group precursor depends upon the desired amino groups on the diamond surface. By way of illustration, $-NH_2$ amino groups may be covalently bound to a diamond surface by exposing the diamond surface to a plasma formed from a gas comprising ammonia ($NH_3$). The plasma conditions, e.g., power, pressure, and exposure time, may be adjusted to provide a desired surface coverage of amino groups (e.g., maximum surface coverage). The plasma is typically a radio-frequency (RF) plasma, but this is not required. Additional illustrative details of plasma deposition of amino groups are provided in the Examples below.

In some embodiments, the method may further comprise exposing the plasma treated diamond surface to an acid to provide the amino group. This can be useful to protonate amino groups (e.g., $-NH_2$) covalently bound to the diamond surface via the plasma in order to provide the desired amino groups (e.g., $-NH_3$). This step is not necessary if the plasma treatment directly provides quaternary amino groups (e.g., $-NR_1R_2R_3^+$).

Applications

The amino-terminated diamond surfaces can be used as electron emitters for catalyzing the reduction of a variety of molecules, such as those capable of reduction via a one-electron reduction process or those that undergo proton-coupled electron transfer processes. The amino-terminated diamond surfaces are well-suited for the reduction of small molecules whose one-electron reduction processes involve high-energy intermediates. Reduction reactions that can be carried out using the amino-terminated diamond surface include, but are not limited to, the reduction of $N_2$ to $NH_3$ or hydrazine ($N_2H_4$); the reduction of $CO_2$ to CO, or organic molecules such as methane ($CH_4$), formaldehyde ($H_2CO$) or methanol ($CH_3OH$); and the reduction of nitrogen oxides ($NO_x$, i.e., NO and $NO_2$) to $N_2$. Other molecules that can be reduced include benzene ring-containing organic molecules of the type that are reducible via Birch reduction. Examples of such molecules include substituted and unsubstituted benzene and naphthalene. Benzene may be reduced to organic molecules having a 1,4-cyclohexadiene ring.

The reductions may be single-step reductions or multiple (e.g., two or more) step reductions. For example, the amino-terminated diamond surfaces can be used to reduce $CO_2$ to CO, which can be further reduced to other reduction products, such as $CH_4$, $H_2CO$ and/or $CH_3OH$. Alternatively, the intermediate reduction products in a multiple-step reduction scheme can themselves be used as the starting product in a single-step reduction. For example, rather than starting with $CO_2$, CO can be used as a starting product in a single-step reduction scheme for the production of $CH_4$, $H_2CO$ and/or $CH_3OH$.

The emission of electrons from the amino-terminated diamond surfaces is induced by exciting electronic transitions defined by the energy band structure of the amino-terminated diamond. The excited emitted electrons are capable of subsequently reducing molecules to form reduction products as described above. Thus, the amino-terminated diamond is the active material from which the excited emitted electrons originate and substantially all of the reduction product is formed via such excited emitted electrons. This is by contrast to composite electrodes comprising diamond simply as a conductive material and some other material (e.g., silicon) as the active material from which excited electrons originate.

The emission of electrons from the amino-terminated diamond surfaces can be induced by light. Thus, in some embodiments, a method for the photoreduction of molecules comprises illuminating an amino-terminated diamond surface with light comprising a wavelength sufficient to induce the emission of electrons from the amino-terminated diamond surface into a sample comprising the molecules to be reduced. The emitted electrons induce the reduction of the molecules to form a reduction product which can be separated from the sample and collected. The wavelength(s) of light are selected depending upon the electronic transition of amino-terminated diamond to be excited. By way of illustration, the wavelength(s) can be that which excites electrons from the valence band of the diamond to the conduction band of the diamond, i.e., wavelengths of about 230 nm (corresponding to the 5.5 eV bandgap energy of diamond) or lower. As another illustration, for n-type diamond, e.g., nitrogen-doped diamond, light having longer wavelengths (as compared to the bandgap energy of diamond) may be used to excite electrons from another occupied band of the diamond (e.g., a donor band). In such an embodiment, light having a wavelength(s) of about 550 nm or less or a wavelength(s) in the range of from about 340 nm to about 550 nm or from about 440 nm to about 550 nm may be used. In addition, as described in the Examples below, amino-terminated diamond can comprise filled defect states and light having longer wavelengths (as compared to the bandgap energy of diamond) may be used to excite electrons from these states.

The light may be selected such that it maximizes the overall photoemission efficiency of the amino-terminated diamond. This means that the light has a spectral distribution (i.e., a range of wavelengths and a power/intensity at those wavelengths) which maximizes the overall photoemission efficiency of the amino-terminated diamond. The peak in the spectral distribution of such light may substantially coincide with the energy of a particular electronic transition, e.g., a peak at 270 nm or less, or a peak at about 230 nm.

The sample which receives the electrons emitted from the amino-terminated diamond surfaces can be a fluid sample. The fluid of the fluid sample in which the reductions are carried out can be a liquid or supercritical fluid. In some embodiments, the fluid is the liquid or supercritical fluid form of a reduction reactant. For example, in the reduction of $CO_2$, the fluid of the fluid sample can be liquid $CO_2$ or supercritical $CO_2$.

In other embodiments, the fluid of the fluid sample comprises a solvent for the molecules to be reduced. Examples of liquid media that can provide a solvent for the molecules to be reduced and/or other reactants include water, aqueous solutions or organic solvent-based solutions. Suitable organic solvents include those in which the molecules to be reduced have significant solubility. Examples of suitable organic solvents include propylene carbonate (PC), dimethyl formamide (DMF) and methanol, in which $CO_2$ has substantial solubility. In addition, it is advantageous if the solvent is able to stabilize the solvated electrons emitted from the amino-terminated diamond. An example of an organic solvent in which solvated electrons are very stable is hexamethylphosphoric triamide (HMPA).

The molecules to be reduced can be introduced into the fluid along with other reactants, such as $H_2$. Gaseous reactants can be introduced into the fluid by flowing or bubbling them through the fluid sample. In some embodiments, the fluid sample is saturated with the reactant in order to maximize the product yield.

The fluid sample can comprise other additives, e.g., an acid capable of protonating amino groups on the amino-terminated diamond surface under the conditions in which the reductions are to be carried out.

The amino-terminated diamond surfaces can also be used to emit electrons into a vacuum.

The reduction reactions catalyzed by the amino-terminated diamond surfaces can be carried out in a reduction system comprising a reduction cell; a light source configured to illuminate at least a portion of the reduction cell with light; and a reduction product collection cell configured to collect reduction product generated in the reduction cell. In this reduction system, the reduction cell comprises a sample comprising the reactant molecules to be reduced and the amino-terminated diamond. The light source is selected to emit radiation having any of the wavelengths described above. The light source may be an ultraviolet light source that emits light with wavelengths of about 230 nm or lower. The light source may be a visible light source that emits light with wavelengths of about 550 nm or lower. However, particularly if doped diamond is utilized, a light source that emits across one or more of the UV, near-UV and visible regions of the electromagnetic spectrum may be used. Broadband light sources, such as Xe arc lamps and HgXe arc lamps are suitable for this purpose. Optionally, filters can be used to filter out unwanted radiation, such as infrared radiation.

In some embodiments, the reduction system assumes a single reduction cell geometry, while in other embodiments an H-cell geometry is used. In the single reduction cell geometry, the amino-terminated diamond in the reduction cell has no external electrical connection and, therefore, must induce both oxidation and reduction reactions in order to achieve charge neutrality. In the H-cell geometry an amino-terminated diamond electrode is immersed in the sample in a first reduction cell and a counter electrode (e.g., a platinum electrode) that is electrically connected to the amino-terminated diamond electrode is immersed in an oxidation medium as a second cell (the oxidation cell). In this geometry the sample and the oxidation medium are in electrical contact but do not mix and the oxidation and reduction reactions are separated.

The reduction systems described in U.S. Pat. No. 8,986,532, which is herein incorporated by reference, may be used.

Once the reduction product is formed, it can be separated from the sample and captured. For example, gas phase reduction product molecules will be generated as a gaseous effluent that can be collected in a collection cell after it escapes a fluid sample.

Figure 9:
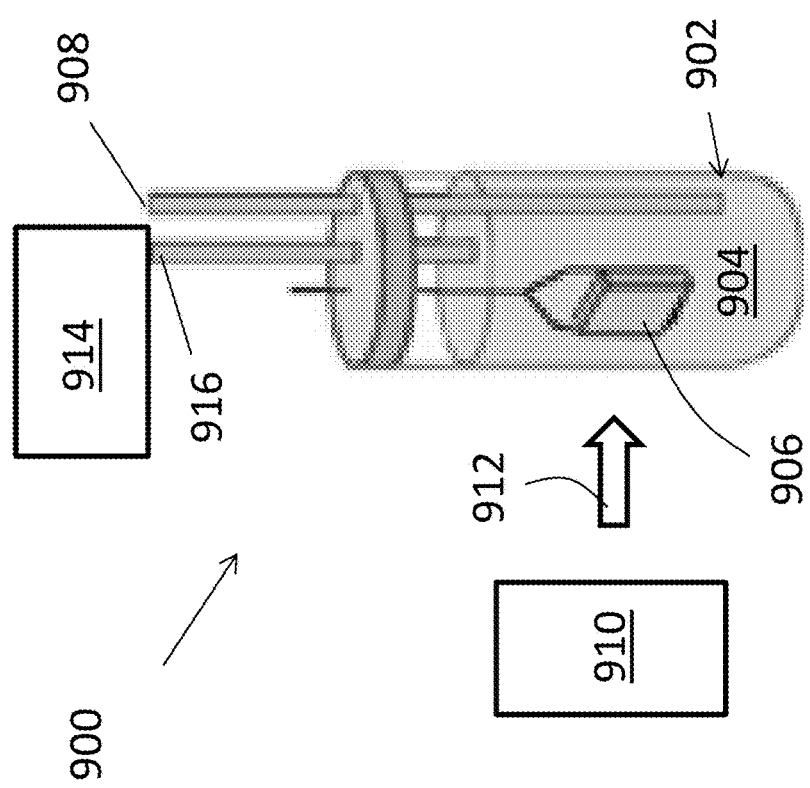

FIG. 9 is a schematic depiction of a reduction system according to an illustrative embodiment.

In embodiments where an amino-terminated diamond electrode is utilized, a counter electrode can also be immersed in the sample. In such embodiments, a voltage source in electrical communication with the electrodes can be used to apply a voltage between the amino-terminated diamond electrode and the counter electrode. The applied voltage can be that which is sufficient to "push" the electrons away from amino-terminated diamond surface after they are emitted and into the sample. However, the applied voltage is desirably small such that it does not interfere with the photocatalytic nature of the reduction process. Applied voltages of 10 V or less, 5 V or less, or 2 V or less may be used.

EXAMPLES

This example demonstrates the preparation, characterization and photoemission performance of amino-terminated diamond surfaces and compares the amino-terminated diamond surfaces to hydrogen-terminated (H-terminated) diamond surfaces.

Materials and Methods

Sample Preparation:

Electrochemical grade B-doped diamond (Element Six) was H-terminated with hydrogen plasma in a microwave enhanced plasma chamber. (See Thoms, B. D., Owens, M. S., Butler, J. E. & Spiro, C. PRODUCTION AND CHARACTERIZATION OF SMOOTH, HYDROGEN-TERMINATED DIAMOND C(100). *Applied Physics Letters* 65, 2957-2959, doi:10.1063/1.112503 (1994).) In the process, the sample was kept in $H_2$ pressure of 45 Torr with a microwave power of 600 W for 15 min. Then microwave power was reduced to zero over a time period of several minutes, and the H-terminated diamond was left in the $H_2$ atmosphere for another 15 min to cool near room temperature.

Amino termination was conducted in a customized RF plasma chamber in which pure ammonia pressure was kept at 1.6 Torr with an applied radio-frequency power of 25 W at a frequency of 13.56 MHz. The process takes up to 10 min to achieve full amino coverage.

FIGS. 1A-C show schematic illustrations of OH-terminated (A), H-terminated (B) and amino-terminated (C) diamond surfaces. Also labeled is the bandgap of diamond (5.47 eV) and the electron affinities of each surface, 0.4 eV for OH-terminated, −0.8 eV for H-terminated, and −X eV for amino-terminated diamond surfaces.

Optical emission spectroscopy (OES) (Ocean optics) was used to study the components of the ammonia plasma. Species that may present in $NH_3$ plasma are $NH_3$, $NH_2$, NH, N, $N_2$, H, $H_2$, $N_2^+$ and e. Among them, $N_2$, NH, H, $N_2$+ can emit light between 200 nm and 900 nm. In these experiments, only $N_2$ and NH were observed. Four peaks which appeared between 300 nm and 400 nm were attributed to the emission of $N_2$. NH radicals have a single emission peak which overlaps with the strongest emission peak of $N_2$. At higher RF power and lower pressure (e.g., 1.7 torr $NH_3$, 55 W), $N_2$ and $H_2$ were major species. At lower RF power and higher pressure (e.g., 1.6 torr $NH_3$, 25 W), the amount of NH overwhelms over $N_2$. The light emitted by plasma was collected by an optical fiber (QP400-2-UV/VIS) adjacent to plasma and analyzed with an Ocean Optics system (part #: USB 2000+).

The amino-terminated diamond surface was characterized with X-ray photoelectron spectroscopy (XPS) and by colorimetric analysis of the surface amino group coverage. XPS was taken with a pass energy of 58.7 eV. The XPS spectrum showed a large peak centered at 399.2 eV, indicative of amino groups on the surface. Sulfo-succinimidyl-4-O-(4,4'-dimethoxytrityl)-butyrate (SDTB) colorimetric method was used to characterize the amount of primary amino groups on the surface. (See Gaur, R. K. & Guptal, K. C. A Spectrophotometric Method for the Estimation of Amino Groups on Polymer Supports. *Analytical Biochemistry* 180, 253-258 (1989).) The dye can liberate light-absorbing trityl groups when it reacts with amine and concentrated trifluoroacetic acid. Secondary and tertiary amine won't contribute to the total light absorbance so the SDTB method measures the $NH_2$ groups only. The $NH_2$ coverage was calculated by measuring absorbance at 498 nm and fitting to a calibration curve made with a series of standards. XPS showed a surface coverage of $NH_2$ groups of 2.3 N atoms/$nm^2$, while colorimetric analysis of the amino groups showed an $NH_2$ coverage of 0.6 groups/$nm^2$.

The acidification of amino-terminated diamond was carried out by immersing grafted samples into HCl solution for 1 min and then gently drying with nitrogen flow.

Figure 2:
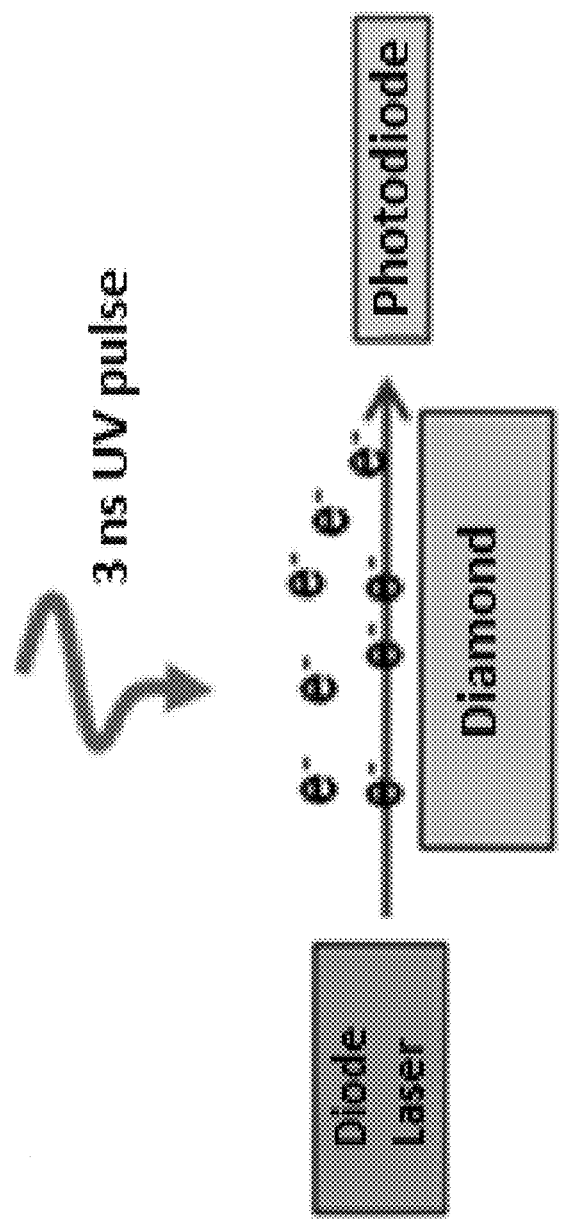

Characterization:

Transient absorption measurements were the most direct way to measure solvated electron production from diamond owing to the broad light absorption band of water solvated electron near 720 nm at room temperature. The apparatus of the transient absorption spectroscopy is depicted in FIG. 2. The diamond sample was illuminated with a pulsed ultraviolet laser (NT340, EKSPLA, Inc., Vilnius, Lithuania) to create solvated electrons near its surface. A 705 nm diode laser (Newport LP705-SF15) emitted red light parallel to the diamond to probe solvated electrons. The transmitted light was detected using a photodetector (Newport model 818-BB-21) followed by an 100× amplifier (Femto DHPCA-100) and then recorded by a 4 GHz digital oscilloscope (Agilent Model DSO9404A).

Electrical measurements were conducted in a customized three-electrode Teflon cell with a diamond working electrode and a Pt mesh counter-electrode and an Ag/AgCl working electrode. The sample had an exposed area of 0.2 $cm^2$. Impedance spectroscopy measurements were performed at room temperature in 1 M aqueous KCl solution using a three-electrode potentiostat (Solartron 1287) and an impedance analyzer (Solartron 1260).

Surface photovoltage measurements were used to characterize the charge separation efficiency. In these measurements, the sample was briefly illuminated with the same pulsed laser used for transient absorption. The separation of charge, such as emission of electrons, induced a transient photocurrent that was picked up by a Pt mesh electrode placed 0.075 mm away. This transient current generated between the two electrodes was then amplified by an 80× gain amplifier (Model TA2000B-3, FAST ComTec GmbH, Germany) and recorded by digital oscilloscope.

X-ray photoelectron spectroscopy (XPS) data were obtained using a modified Physical Electronics system equipped with an aluminum Kα source, a quartz-crystal X-ray monochromator, and a 16-channel detector array. Photoelectron spectroscopy was performed in ultrahigh vacuum (P<6×$10^{-10}$ Torr). A pass energy of 58.7 eV and step size of 0.125 eV were used unless otherwise specified. Ultraviolet photoemission spectroscopy (UPS) measurements were performed using the same apparatus, using excitation from a He(I) resonance lamp. During UPS measurements, the samples were biased by 9 to 11 V to compensate for differences in samples and analyzer vacuum levels. All UPS binding energies had been corrected for the applied bias. The electron affinities were calculated from the energy width (w) of the emission spectrum, the known photon energy (21.2 eV) and diamond bandgap (5.5 eV) using Equation 1

$$\chi = E_{photon} - E_{gap} = 21.2 - 5.5 - w \quad \text{(Equation 1)}.$$

Results and Discussion

Transient Absorption Measurements of Electron Emission.

Figure 3:
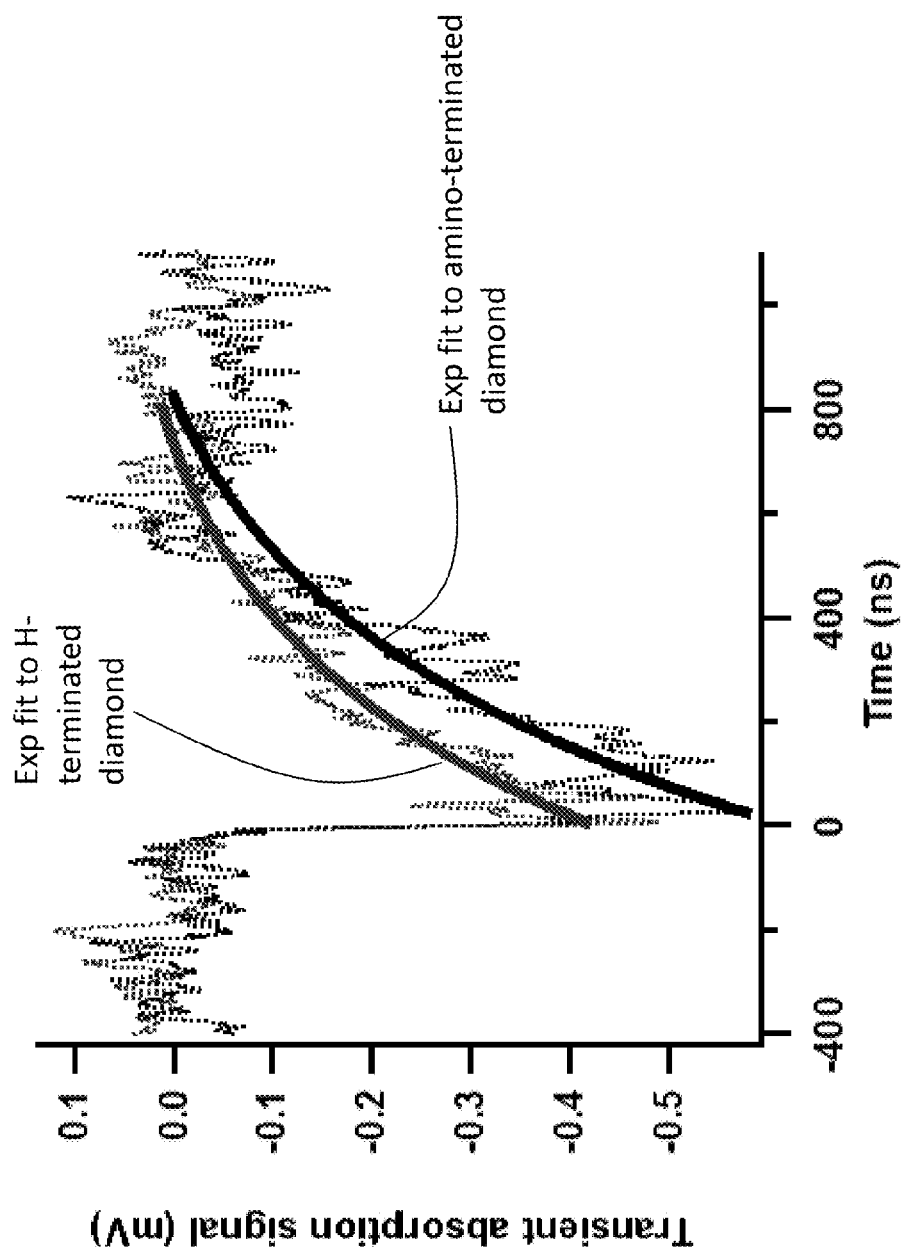

Transient light absorption directly measures the solvated electron population. FIG. 3 compares the transient absorption waveforms from H-terminated and amino-terminated diamonds using 210 nm UV illumination. At such wavelength (shorter than 225 nm), the photon energy is sufficient to exceed diamond's bandgap, and absorption through bulk band-to-band transitions can occur. The intensity of the 700 nm probe laser experiences an instant drop after the UV laser pulses and then returns to its baseline. The waveforms are fitted to a simple exponential decay function of the form $V = B + A_o \exp^{-t/\tau}$. The initial decrease in intensity $A_o$ is a direct measure of the solvated electron yield, while the time t to return to baseline is determined by the reaction of solvated electrons with $O_2$ and other species in solution. The resulting fits are embedded in each waveform in FIG. 3. This example focuses on the efficiency of the solvated electron yield, rather reactions induced by the solvated electrons. While electron yields are observed for both of the samples, there are reproducible differences between them. The $A_o$ of amino-terminated diamond is −0.72 as compared to −0.67 for H-terminated diamond, which indicates a more efficient electron production for amino-terminated diamond. As will be discussed later, this result is consistent with a model in which photoelectron yield is controlled by the surface polarization.

Dependence of Solvated Electron Yield on Illumination Intensity.

Figure 4:
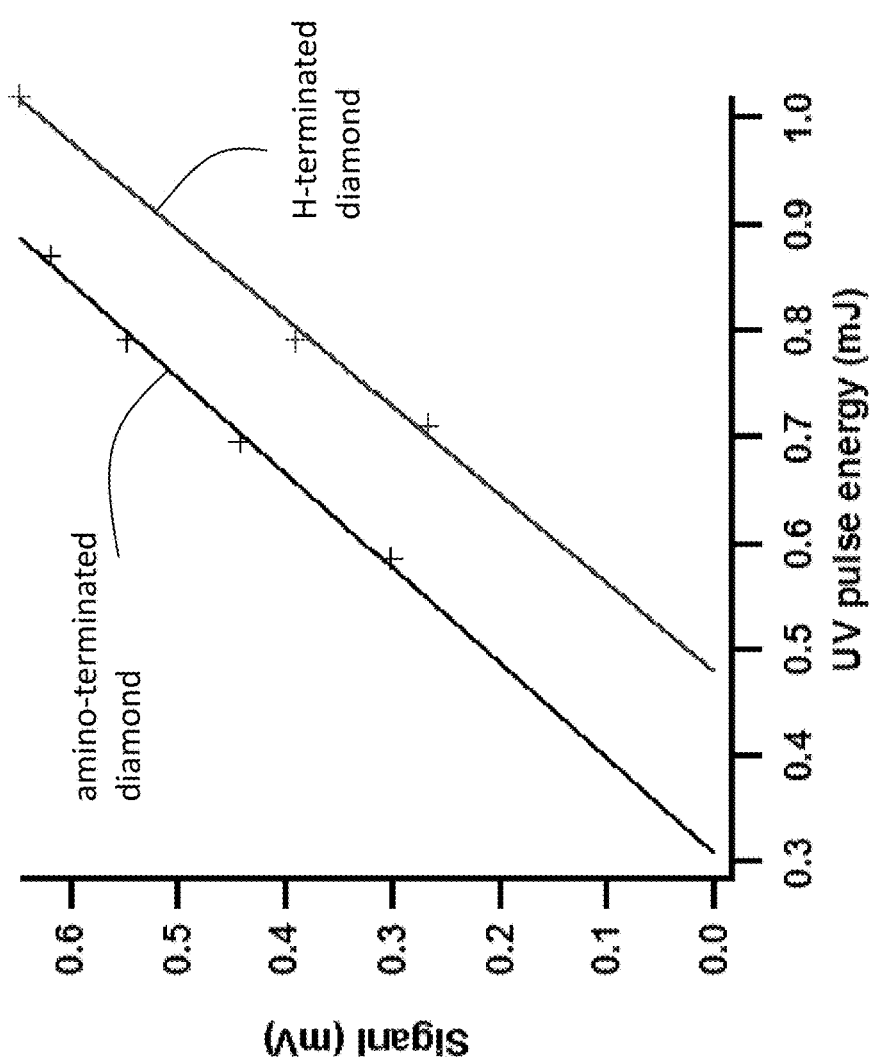

Apart from taking measurements at fixed UV power of 0.79 mJ, the solvated electron yield as a function of the fluence of the incident laser, which was set to a wavelength of 210 nm, was also measured. FIG. 4 shows that the solvated electron population increases linearly with UV power for both types of diamond, but with a non-zero intercept. A distinct threshold exists for each surface termination, below which little or no solvated electron emission can be detected. Fitting the data to a straight line yields slopes of 1.20±0.08 ($R^2$=0.995) for H-terminated diamond and 1.12±0.06 ($R^2$=0.994) for amino-terminated diamond. The thresholds energies, determined from the x-intercepts, are 0.48±0.03 for (H-terminated diamond) and 0.31±0.02 mJ (amino-terminated diamond). Thus, the data show that the slopes for amino- and H-terminated samples are similar, but the threshold for amino-terminated diamond is significantly lower. The good linearity suggests the solvated electron production is predominantly a single-electron process.

Electrical Measurements.

Without wishing to be bound by a particular theory, it is believed that the promotion in electron emission efficiency from amino-terminated diamond results from a larger downward band-bending and better charge separation in the space charge region of diamond. The open circuit potential (OCP) directly measures potential of the Fermi level of the working electrode with respect to Ag/AgCl reference electrode. An OCP of 1.01 V was measured for amino-terminated diamond compared with 0.24 V for H-terminated diamond. The significantly more positive value for the amino-terminated diamond shows that its Fermi energy is higher in energy than that of H-terminated diamond.

To further characterize the electrical properties of the surfaces, Mott-Schottky measurements were performed. Impedance spectroscopy measurements were used to investigate the interfacial electrical properties as a function of frequency (data not shown). The impedance spectra show that at frequencies between 800 Hz and 10 kHz the impedance Z decreases linearly with increasing frequency f. This functional dependence indicates that in this frequency range the impedance is dominated by the space-charge capacitance of the diamond sample. The complex impedance was modeled as a simplified Randles cell, in which the space-charge region is modeled as a parallel resistor and capacitor, and the solution resistance is simple resistor.

Figure 5A:
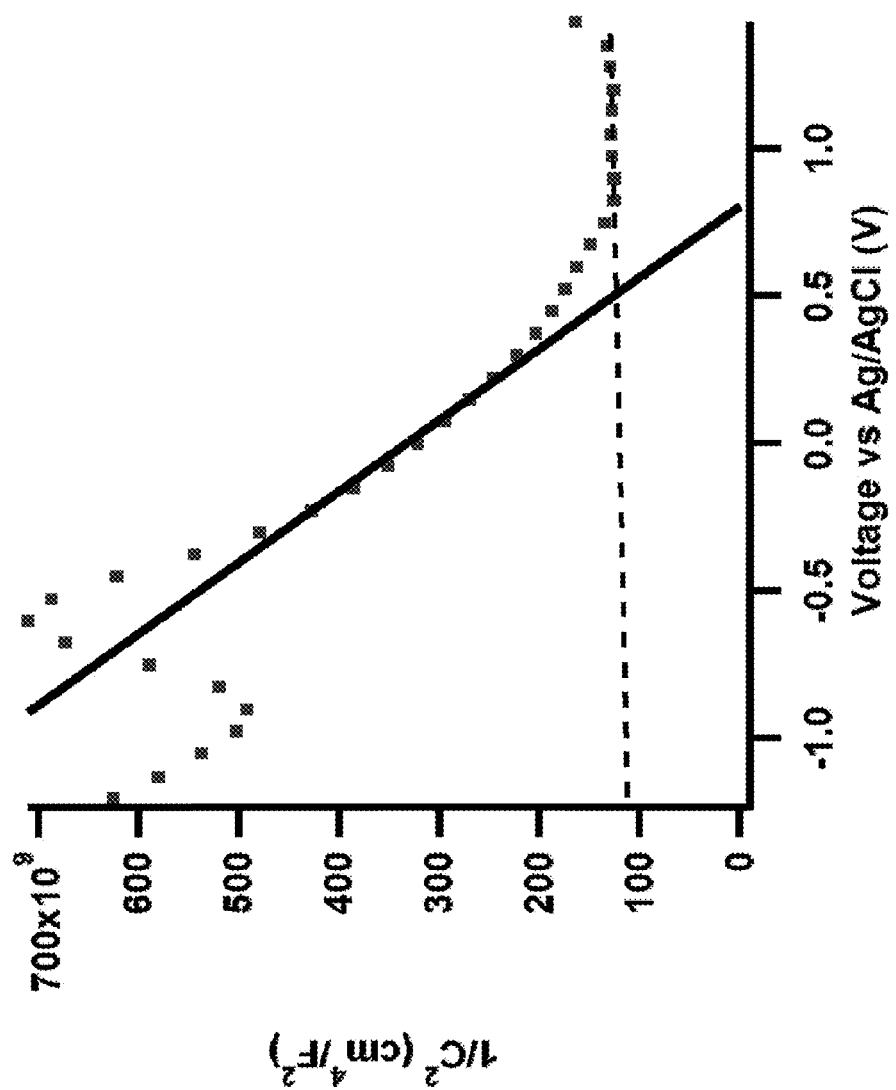
Figure 5B:
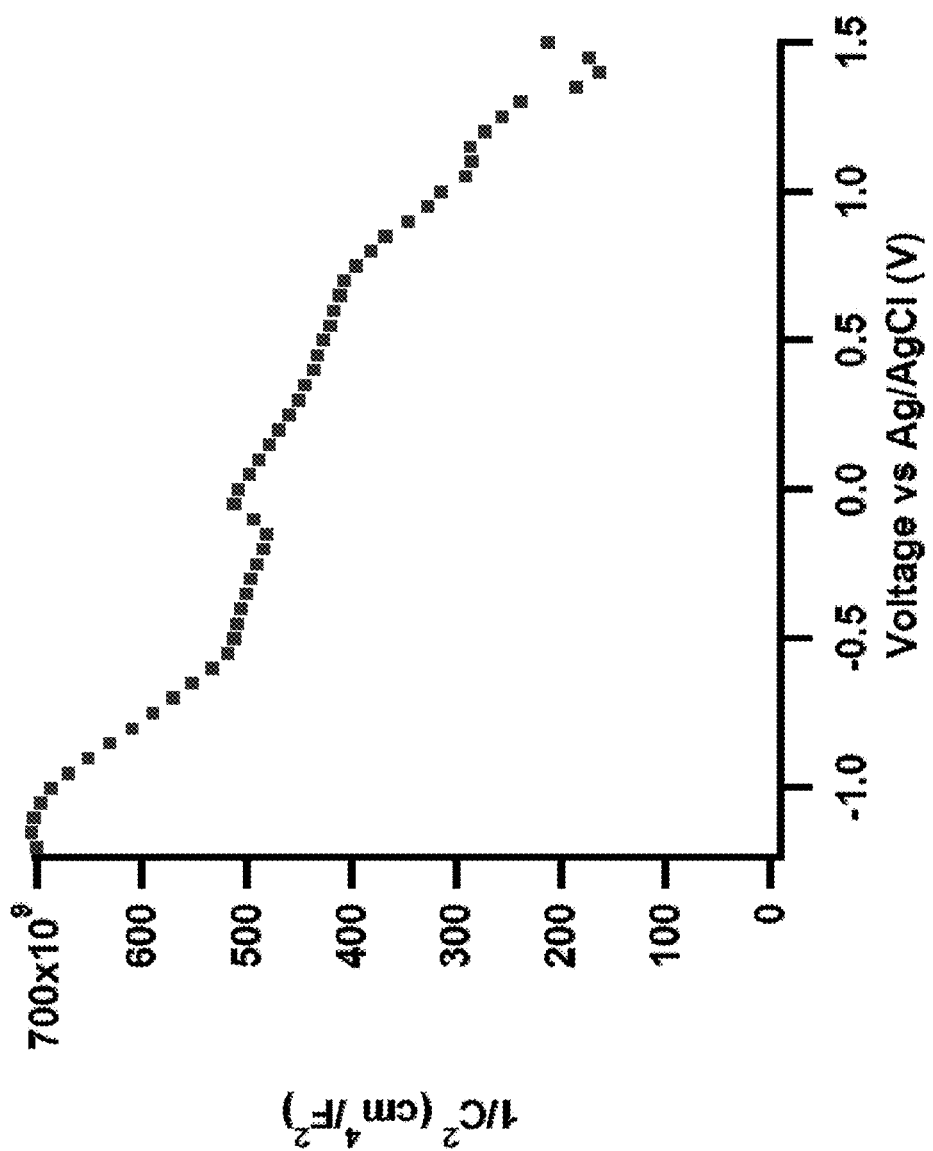

FIGS. 5A-B show the conventional representation of Mott-Schottky data as a plot of $1/C^2$ vs. potential for H-terminated B-doped diamond (A) and amino-terminated B-doped diamond (B). FIG. 5A shows a relatively large feature near −0.5 V that can be attributed to charging of a surface state. Under biasing conditions, the total interfacial capacitance region can be represented analytically as Equation 2

$$\frac{1}{C^2} = \frac{1}{C_{DL}^2} + \frac{2}{\varepsilon \varepsilon_0 e N_A A^2}\left(V - V_{FB} - \frac{kT}{e}\right). \quad \text{(Equation 2)}$$

where $N_A$ is the concentration of electrically active acceptors (dopants), V is the applied potential, $V_{FB}$ is the flat band potential and $C_{DL}$ is the double-layer capacitance, which is nearly independent of potential at the high salt concentrations used here. The primary consequence of the double-layer capacitance is that when V is large, $$\frac{1}{C^2}$$

approaches the limiting value of $$\frac{1}{C_{DL}^2}.$$

In the present case $$\frac{1}{C_{DL}^2} = 1.26 * 10^{11} \text{ cm}^4/\text{F}^2.$$

For the H-terminated sample, the intercepting point of the solid line and dashed line yields a flat band potential 0.5-0.8 V; this value has some uncertainty due depending on which data range is used. This value is close to a reported value of 0.4 V for H-term B-doped diamond grown on Si. (See Tse, K.-Y. et al. Electrical Properties of Diamond Surfaces Functionalized with Molecular Monolayers. *Journal of Physical Chemistry* B 109, 8523-8532 (2005).)

As shown in FIG. 5B, a Mott-Schottky experiment on amino-term diamond was also conducted at the same experimental conditions. The plot is clearly shifted toward higher potentials. As the potential is increased beyond +1.4 V there is a clear onset of electrochemical reactions evidenced visually by the appearance of bubbles. However, if it assumed that the double-layer capacitance is the same as that for the H-terminated sample, then the flat-band potential of approximately +1.4 V (vs. Ag/AgCl) is obtained.

The Mott-Schottky measurements indicate the both H-terminated and amino-terminated diamond samples are p-type with downward band-bending. The amino terminated sample has both a more positive OCP and a larger downward band-bending.

Surface Photovoltage Measurements (SPV).

In principle, larger band bending in space charge region can improve charge separation and the ability to emit electrons. In order to verify that the charge separation benefits from the surface polarization of protonated amino groups, transient surface photovoltage (SPV) measurements on diamond samples were used. Experiments were performed before and after exposure to acidic conditions; the latter were used to ensure protonation of the amino groups. Surface photovoltage measurements characterize the amount and polarity of excess charges that accumulate at the outermost surface of the sample. In these measurements, the sample was illuminated with a pulsed laser (3 ns pulse width); the absorption of light produces electron-hole pairs. Separation of electrons and holes by the electric field in the diamond space-charge layer leads to a transient displace current that is measured using a second, capacitively coupled electrode placed ~75 μm away. Time traces of I(t) were obtained (data not shown). The sign of the current reveals where electrons or holes accumulate near the surface (dictated by whether the band-banding is upward or downward), and integrating the I(t) curve yields the amount of charge separation $Q_{trans}$.

Figure 6:
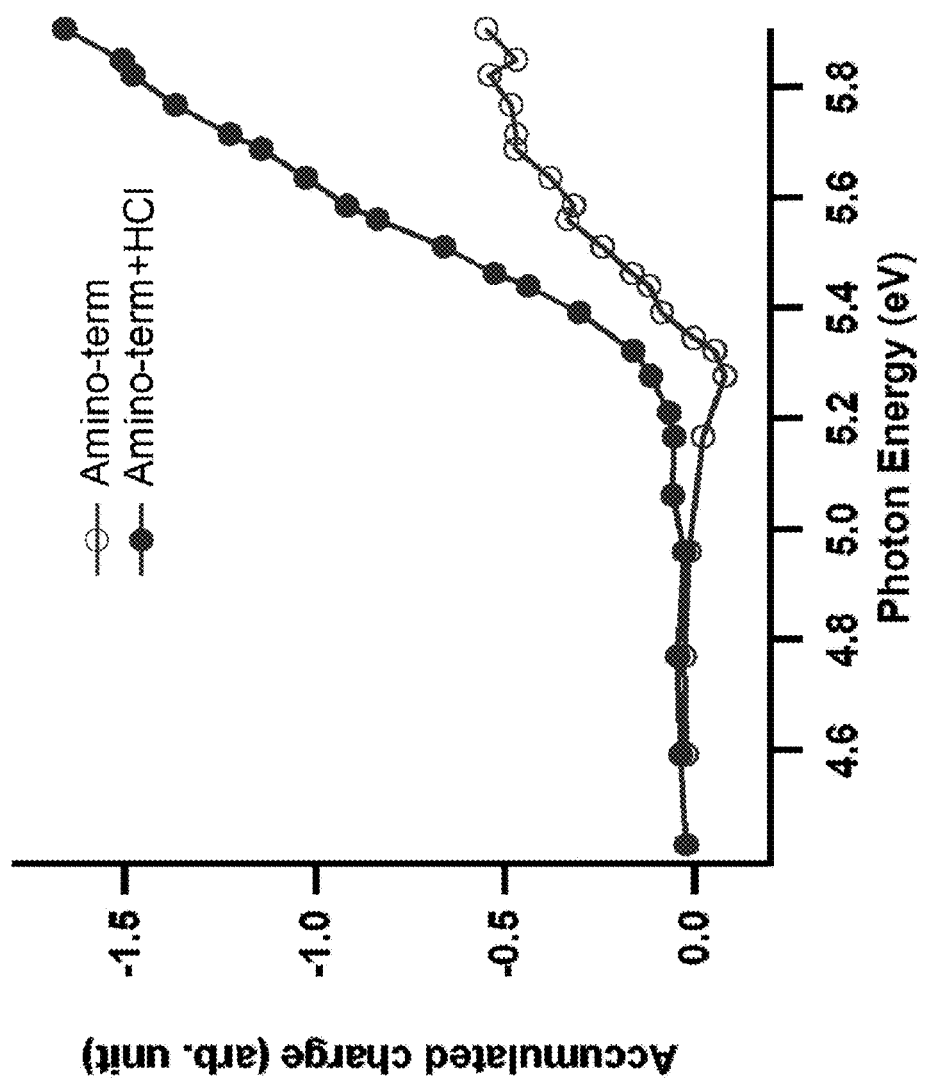

FIG. 6 shows the magnitude of the maximum ($Q_{max}$) as a function of the incident photon energy for amino-terminated samples before and after acidification with HCl between 4.4 eV (280 nm) and 5.9 eV (210 nm). Here the total pulse energy was kept constant at 0.1 mJ/pulse. No SPV response was observed for photon energies<4.4 eV (λ>280 nm). The magnitude of SPV response depends strongly on the surface conditions. At $E_{photon}$>5.4 eV, the acidified amino-terminated sample yields a response approximately 3 times that of the non-acidified amino-terminated sample. This is attributed to the fact that the surface positive charge induces a downward band-bending or local electrical field which draws electrons to the very surface. At slightly lower photon energies of 4.9 eV to 5.3 eV, the amino-terminated sample shows a region where the sign inverts, indicating that the surface accumulates positive charge. This most likely arises from surface states in the bandgap; excitation of electrons from mid-gap states to the conduction band could give rise to a net positive surface charge.

Ultraviolet Photoelectron Spectroscopy (UPS).

Figure 7:
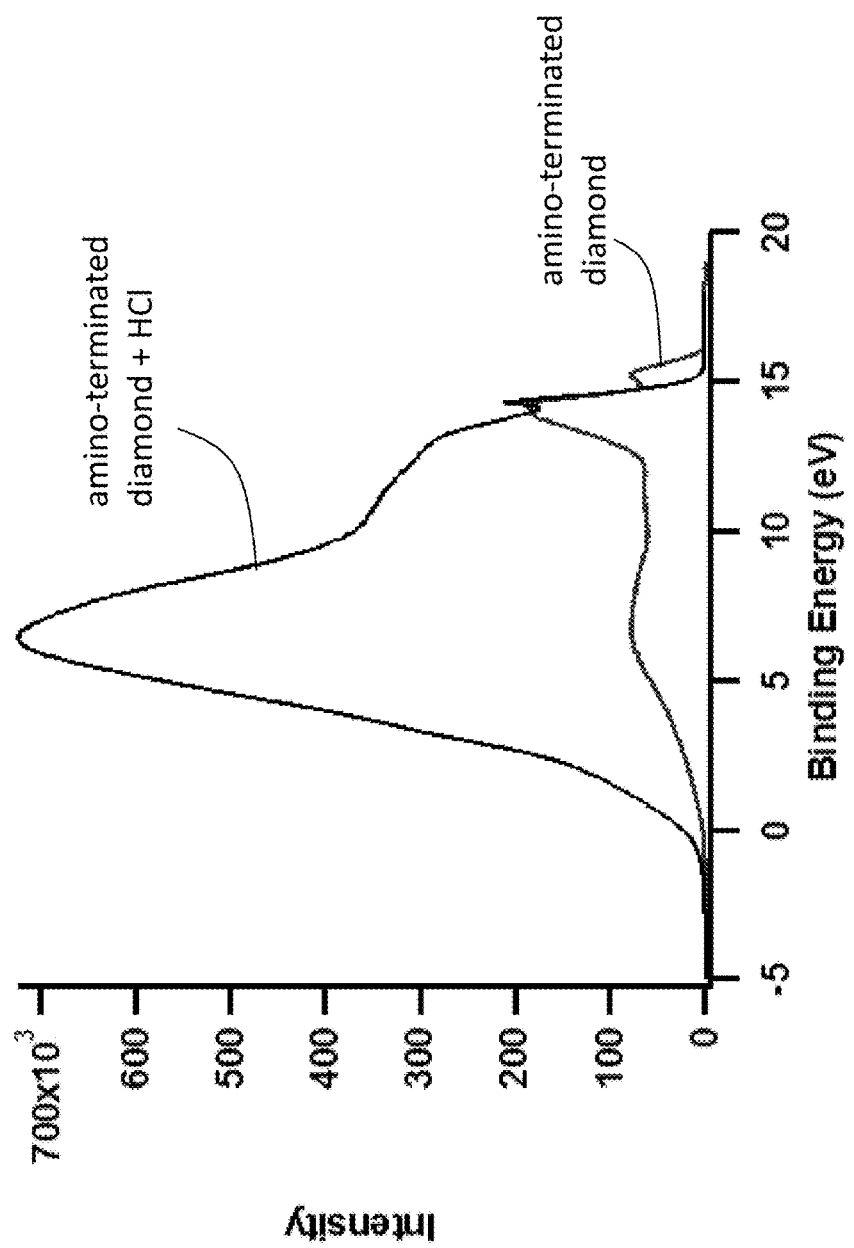

As shown in FIG. 7, UPS was used to compare the electron emission property of amino-terminated diamond before and after acidification. There are mainly three peaks on the UPS spectrum of amino-terminated diamond. The first is located 6.5 eV below the Fermi energy. The second one, which is the highest one, is at 14.3 eV. The last one is at 15.2 eV. After acidification, the first two peaks remain at roughly the same binding energy but the third one disappears. There is a large increase in photoelectron generation, especially on the low binding energy side. The height ratio of the low binding energy peak and the high binding energy peak changes by nearly an order of magnitude.

X-Ray Photoelectron Spectroscopy (XPS).

Figure 8A:
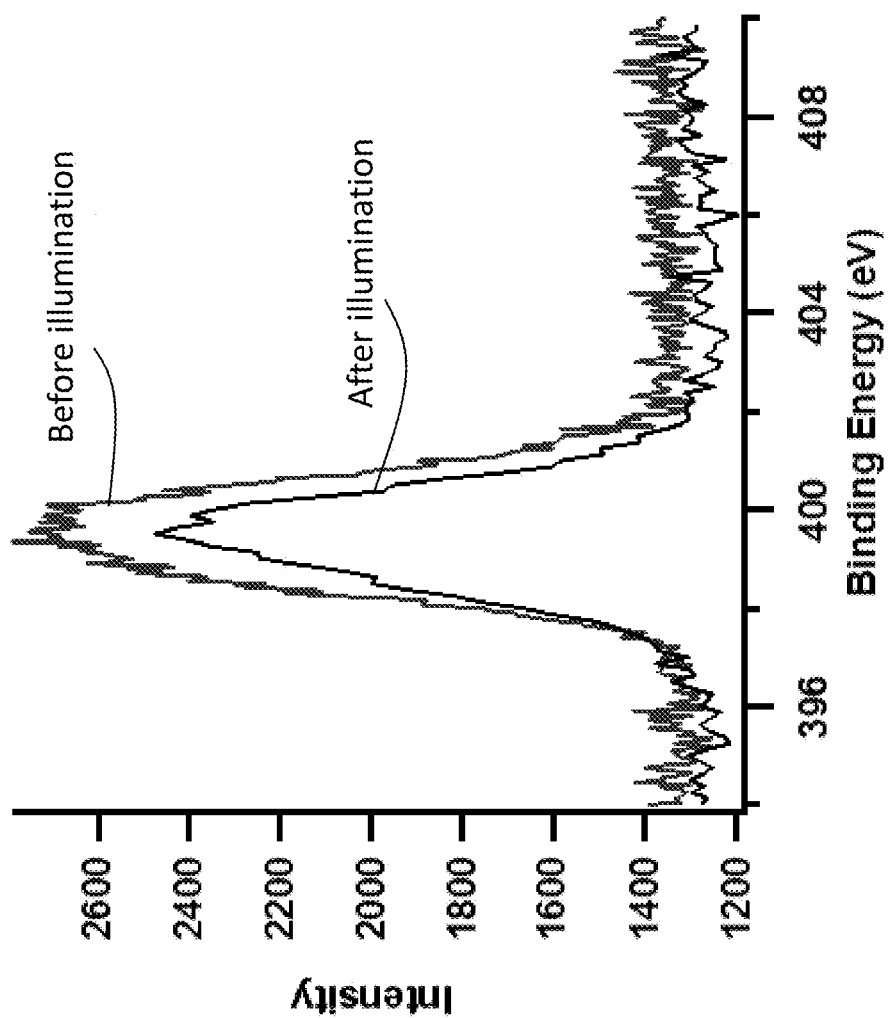
Figure 8B:
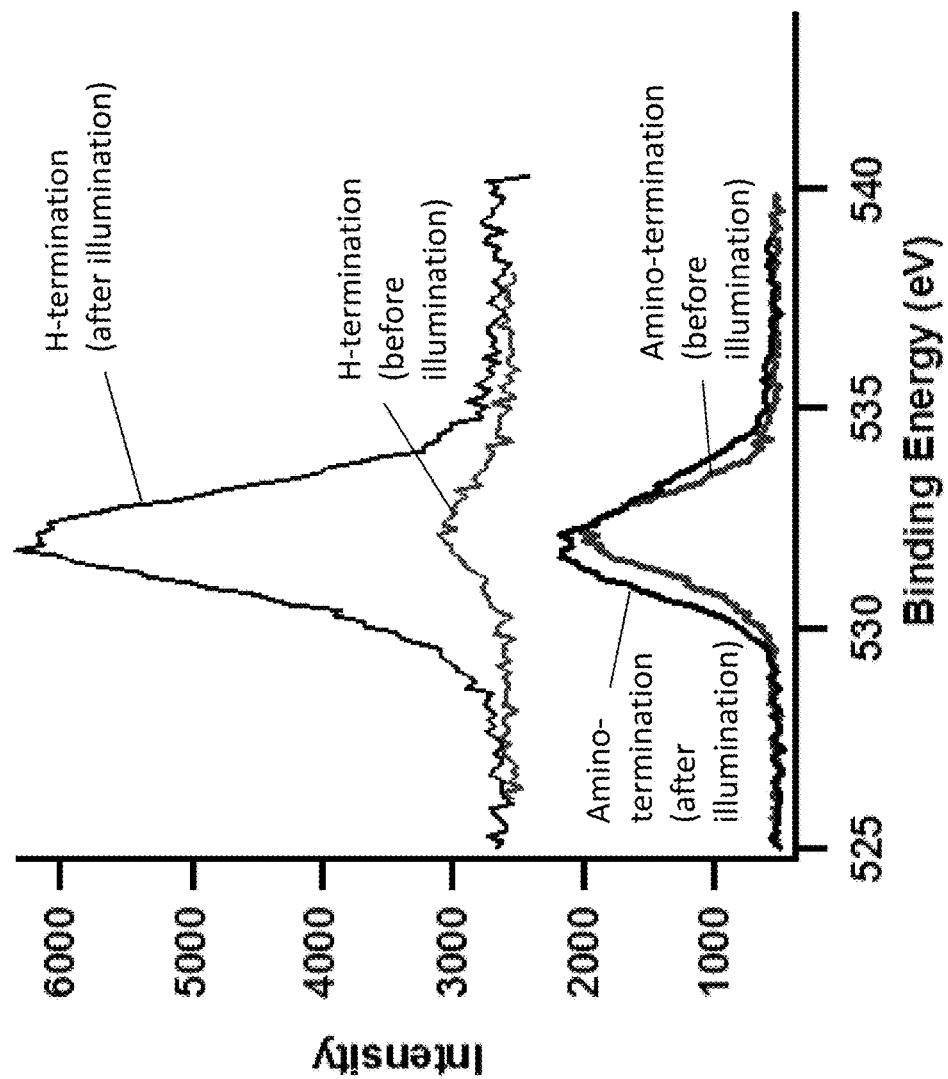

XPS was used to investigate the coverage of N and O before and after extended UV irradiation. FIG. 8A shows XPS data collected from amino-terminated diamond before and after continuous illumination by a 450 W HgXe lamp for 12 hours in water saturated with $N_2$. The data shows that the nitrogen coverage decreases by 20% (from 2.3 to 1.84 N atoms/$nm^2$), but the N peak retains its shape and shows no sign of oxidation, which would be evidenced by a shoulder at higher binding energies. More notable is the comparison of H-terminated and amino-terminated diamond shown in FIG. 8B. Here it can be seen that the oxygen coverage on the amino-terminated surface slightly increases from 1.6 to 2.0 atoms/$nm^2$ while oxygen coverage on the H-terminated surface increased ten-fold, from (0.5 to 5.0 oxygen atoms/$nm^2$) in the same amount of time. It is concluded that amino-terminated diamond is chemically-stable under extended UV irradiation and only a small portion of C—N bonds break with little sign of oxygen attached to nitrogen atoms. The significantly greater chemical stability of amino-terminated diamond as compared to H-terminated diamond is particularly surprising in view of the conventional understanding that H-terminated diamond is a very stable surface.

Discussion

Results have shown that protonated amino-termination enhances the emission of solvated electrons in water compared with H-termination. The protonated amino groups have positive charges which can draw photoexcited electrons closer to the surface. Increasing the electron density on diamond conduction band is very beneficial for photoemission. The amount of such accumulated negative charges was characterized with SPV as shown in FIG. 6. Acidification transforms electron-negative amino groups into strong positive charge carrying groups, which can be used to characterize the influence of surface polarization inversion. The huge increase in SPV signal after acidification strongly supports the conclusion that protonated amino groups lead to better charge separation. Similarly, enhancement of photoemission after acidification is also observed by UPS as shown in FIG. 7. However, it is noted that acidifying amino groups with HCl is a rough simulation to the real situation in water. Unlike the loose double layer structure in water, the solid state Cl⁻ is tightly bonded to the surface which can potentially act as a barrier for electron emission in air or vacuum. Many amino groups (e.g., those having a pKa in the range of 9 to 10) will be protonated in water. The Mott-Schottky measurements provide insight for the role of amino-termination in photoemission in water, because they were conducted in aqueous solution. The results prove that the amino-termination indeed induces larger band-bending. The difference in flat band potential between H-terminated and amino-terminated diamond is believed to be larger than 0.9 V.

The electron photoemission from diamond could further benefit from the excitation from filled defect states associated with the amino-termination. A special region on the SPV result (FIG. 6) was observed where positive charges were accumulated between 4.9 eV and 5.3 eV. This phenomenon has never been found on SPV of H-terminated diamond. The diamond surfaces used in this Example were p-type diamond which have downward band-bending and accumulate negative charge in most cases. The diamond samples were so heavily B-doped ($9 \times 10^{20}/cm^3$) that their bands in the space charge layer are unlikely to bend upward no matter how the surfaces are terminated. Without wishing to be bound by any particular theory, it is hypothesized that the positive sign of the transients corresponds to injection of electrons from the filled defect states into air, which leaves positive charges to be detected. Ma and coworkers' density functional theory (DFT) calculations show that the continuous filled defect states band is a tenth of a volt above the amino-terminated diamond's valence maximum. (See Ma, Y., Jin, H., Dai, Y. & Huang, B. Study of ammonia molecule adsorbing on diamond (100) surface. *Applied Surface Science* 256, 4136-4141, doi:10.1016/j.apsusc.2010.01.097 (2010).) Such filled defect states are absent in H-term diamond. In brief, it is possible to make use of such filled defect states of amino-terminated diamond to fulfill photoemission with less energetic photons.

CONCLUSION

Amino-termination has been successfully achieved with ammonia plasma treatment. It has been demonstrated that the amino-terminated diamond can enhance photoelectron ejection in water comparing with H-terminated samples. The power-dependence study suggests that protonated amino groups lower the emission threshold. This effect is attributed to the larger band-bending induced by the excess surface charges, which is verified by Mott-Schottky and OCP measurements. The key role of protonation was simulated by intentionally acidifying amino-term diamond and characterized with SPV and UPS measurements. The results indicate better charge separation and much higher intensity in photoelectron emission in either air or vacuum. The amino-terminated diamond also resists oxidation substantially and surprisingly better than H-terminated diamond under continuous UV illumination, which helps to prolong the lifetime of diamond as a photoelectron emitter.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more".

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A method for the photoreduction of molecules, the method comprising:
   (a) illuminating an amino-terminated diamond surface comprising amino groups directly covalently bound to the surface of diamond with light comprising a wavelength sufficient to excite an electronic transition defined by the energy band structure of the amino-terminated diamond, thereby inducing the emission of electrons from the amino-terminated diamond surface into a sample comprising molecules to be reduced, the molecules capable of reduction via a one-electron reduction process or a proton-coupled electron transfer process, wherein the emitted electrons induce the reduction of the molecules to form a reduction product; and
   (b) collecting the reduction product.

2. The method of claim 1, wherein the amino groups are selected from the group consisting of primary amino groups, secondary amino groups, tertiary amino groups, protonated primary amino groups, protonated secondary amino groups, protonated tertiary amino groups, quaternary amino groups, and combinations thereof.

3. The method of claim 1, wherein the amino groups are selected from
   —$NR_1R_2$ groups, $NR_1R_2R_3^+$ groups, and combinations thereof, wherein $R_1$, $R_2$ and $R_3$ are independently selected from hydrogen, alkyl and aryl groups.

4. The method of claim 3, wherein $R_1$, $R_2$ and $R_3$ are independently selected from hydrogen and alkyl groups.

5. The method of claim 4, wherein the alkyl groups are linear alkyl groups in which the number of carbons ranges from 2 to 6.

6. The method of claim 1, wherein the amino groups are selected from —$NH_2$, —$NH_3^+$, —$N(CH_3)_2$, —$N(CH_3)_2H^+$, —$N(CH_3)_3^+$ and combinations thereof.

7. The method of claim 1, wherein the diamond is p-type diamond.

8. The method of claim 1, wherein the diamond is not in contact with another photoactive material.

9. The method of claim 8, wherein the diamond is not in contact with silicon.

10. The method of claim 1, wherein the diamond is provided as an electrode which is not in contact with another photoactive material.

11. The method of claim 10, wherein the diamond electrode is substantially free of silicon.

12. The method of claim 1, wherein substantially all of the reduction product is formed via the electrons excited by the electronic transition.

13. The method of claim 1, wherein the light comprises a wavelength which substantially matches the bandgap of the diamond.

14. The method of claim 13, wherein the light comprises a wavelength of about 230 nm or less.

15. The method of claim 13, wherein the light further comprises a wavelength which is longer than the bandgap of the diamond.

16. The method of claim 15, wherein the light comprises a wavelength of about 550 nm or less.

17. The method of claim 1, wherein the light is selected to maximize the photoemission efficiency of the amino-terminated diamond.

18. The method of claim 1, wherein the amino groups are selected from —$NR_1R_2$ groups, —$NR_1R_2R_3^+$ groups, and combinations thereof, wherein $R_1$, $R_2$ and $R_3$ are independently selected from hydrogen, alkyl and aryl groups, with the proviso that the amino groups do not comprise —$NH_2$ and do not comprise —$NH_3^+$.

19. The method of claim 18, wherein $R_1$, $R_2$ and $R_3$ are independently selected from hydrogen and alkyl groups.

20. The method of claim 19, wherein the alkyl groups are linear alkyl groups in which the number of carbons ranges from 2 to 6.

21. The method of claim 1, wherein the amino groups are selected from —$N(CH_3)_2$, —$N(CH_3)_2H^+$, —$N(CH_3)_3^+$ and combinations thereof.

22. The method of claim 1, wherein the amino-terminated diamond surface is characterized by a surface coverage of oxygen that increases by no more than a factor of 1.25 after continuous illumination by a 450 W HgXe lamp for 12 hours in water saturated with $N_2$.

23. A reduction system for the photoreduction of molecules, the reduction system comprising:
   (a) a reduction cell comprising amino-terminated diamond comprising amino groups directly covalently bound to the surface of diamond, the reduction cell further comprising a sample comprising the molecules to be reduced, wherein the amino groups are selected from —$NR_1R_2$ groups, —$NR_1R_2R_3^+$ groups, and combinations thereof, wherein $R_1$, $R_2$ and $R_3$ are independently selected from hydrogen, alkyl and aryl groups, with the proviso that the amino groups do not comprise —$NH_2$ and do not comprise —$NH_3^+$;

(b) a light source configured to illuminate at least a portion of the reduction cell with light having a wavelength sufficient to excite an electronic transition defined by the energy band structure of the amino-terminated diamond, thereby inducing the emission of electrons from the amino-terminated diamond surface into the sample to induce the reduction of the molecules to form a reduction product; and (c) a reduction product collection cell configured to collect the reduction product generated in the reduction cell.

\* \* \* \* \*